US010311105B2

(12) United States Patent
Nice et al.

(10) Patent No.: US 10,311,105 B2
(45) Date of Patent: Jun. 4, 2019

(54) FILTERING QUERIED DATA ON DATA STORES

(75) Inventors: Nir Nice, Kfar Veradim (IL); Daniel Sitton, Tel-Aviv (IL); Dror Kremer, Tel Aviv (IL); Michael Feldman, Pardesiya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/979,467

(22) Filed: Dec. 28, 2010

(65) Prior Publication Data
US 2012/0166447 A1  Jun. 28, 2012

(51) Int. Cl.
G06F 17/30 (2006.01)
G06F 16/903 (2019.01)
G06F 16/2453 (2019.01)

(52) U.S. Cl.
CPC .. *G06F 16/90335* (2019.01); *G06F 16/24532* (2019.01)

(58) Field of Classification Search
CPC ......... G06F 17/30445; G06F 16/24532; G06F 16/90335
USPC ...................................................... 707/746
See application file for complete search history.

(56) References Cited

U.S. PATENT DOCUMENTS 5,421,008 A * 5/1995 Banning et al.
5,584,024 A * 12/1996 Shwartz
5,666,528 A * 9/1997 Thai
5,787,411 A * 7/1998 Groff et al.
6,785,668 B1 * 8/2004 Polo et al. .................... 707/771
6,931,389 B1 * 8/2005 Bleizeffer ......... G06F 17/30306
7,315,894 B2  1/2008 Huntington et al.
7,584,264 B2  9/2009 Cox et al.
(Continued)

FOREIGN PATENT DOCUMENTS

JP  2008-243229 A  10/2008

OTHER PUBLICATIONS

Haas et al., Sequential Sampling Procedures for Query Size Estimation, Jun. 1992, ACM, pp. 341-350.*
(Continued)

*Primary Examiner* — James Trujillo
*Assistant Examiner* — Jessica N Le
(74) *Attorney, Agent, or Firm* — Alleman Hall Creasman & Tuttle LLP

(57) ABSTRACT

A data set may be distributed over many data stores, and a query may be distributively evaluated by several data stores with the results combined to form a query result (e.g., utilizing a MapReduce framework). However, such architectures may violate security principles by performing sophisticated processing, including the execution of arbitrary code, on the same machines that store the data. Instead of processing queries, a data store may be configured only to receive requests specifying one or more filtering criteria, and to provide the data items satisfying the filtering criteria. A compute node may apply a query by generating a request including one or more filter criteria, providing the request to a data node, and applying the remainder of the query (including sophisticated processing, and potentially the execution of arbitrary code) to the data items provided by the data node, thereby improving the security and efficiency of query processing.

20 Claims, 9 Drawing Sheets

(56) References Cited

U.S. PATENT DOCUMENTS

| | | | |
|---|---|---|---|
| 7,650,331 B1 | 1/2010 | Dean et al. | |
| 7,962,442 B2* | 6/2011 | Barsness et al. | 707/600 |
| 8,392,399 B2* | 3/2013 | He | 707/713 |
| 8,533,181 B2* | 9/2013 | Hu et al. | 707/718 |
| 8,555,288 B2* | 10/2013 | Brown et al. | 718/105 |
| 8,700,579 B2* | 4/2014 | Apanowicz et al. | 707/693 |
| 2002/0049700 A1 | 4/2002 | Couch et al. | |
| 2002/0161850 A1 | 10/2002 | Ulrich et al. | |
| 2002/0194166 A1* | 12/2002 | Fowler | 707/3 |
| 2003/0028509 A1* | 2/2003 | Sah | G06F 17/30595 |
| 2004/0034616 A1* | 2/2004 | Witkowski et al. | 707/1 |
| 2004/0199530 A1* | 10/2004 | Avadhanam et al. | 707/100 |
| 2004/0215638 A1* | 10/2004 | Kapoor et al. | 707/100 |
| 2005/0003878 A1 | 1/2005 | Updike | |
| 2005/0038784 A1* | 2/2005 | Zait et al. | 707/5 |
| 2005/0097099 A1* | 5/2005 | Kapoor et al. | 707/3 |
| 2005/0131893 A1* | 6/2005 | Von Glan | 707/3 |
| 2005/0192942 A1* | 9/2005 | Biedenstein et al. | 707/3 |
| 2005/0192953 A1* | 9/2005 | Neale et al. | 707/4 |
| 2005/0223026 A1* | 10/2005 | Chaudhuri et al. | 707/103 R |
| 2007/0022136 A1* | 1/2007 | Keller | G06F 17/30469 |
| 2007/0038618 A1* | 2/2007 | Kosciusko et al. | 707/4 |
| 2007/0078826 A1* | 4/2007 | Bozkaya et al. | 707/3 |
| 2007/0214135 A1* | 9/2007 | Crivat | G06F 17/30539 |
| 2007/0250470 A1* | 10/2007 | Duffy | G06F 17/30445 |
| 2008/0027920 A1* | 1/2008 | Schipunov | G06F 17/30545 |
| 2008/0059408 A1* | 3/2008 | Barsness et al. | 707/2 |
| 2008/0083367 A1* | 4/2008 | Wakai et al. | 118/261 |
| 2008/0177975 A1* | 7/2008 | Kawamura | G06F 17/30339 711/173 |
| 2008/0189239 A1* | 8/2008 | Bawa et al. | 707/2 |
| 2008/0201303 A1 | 8/2008 | Bragiel et al. | |
| 2008/0275841 A1* | 11/2008 | Keller et al. | 707/2 |
| 2008/0288524 A1 | 11/2008 | Dumitru et al. | |
| 2009/0006347 A1* | 1/2009 | Trollope | 707/4 |
| 2009/0055370 A1* | 2/2009 | Dagum | G06F 17/30194 |
| 2009/0125482 A1 | 5/2009 | Peregrine et al. | |
| 2009/0271385 A1* | 10/2009 | Krishnamoorthy | G06F 17/30445 |
| 2009/0327220 A1* | 12/2009 | Meijer et al. | 707/3 |
| 2010/0070489 A1 | 3/2010 | Aymeloglu et al. | |
| 2010/0082588 A1* | 4/2010 | Depreter | G06F 17/30398 707/706 |
| 2010/0082648 A1* | 4/2010 | Potapov et al. | 707/756 |
| 2010/0088315 A1 | 4/2010 | Netz et al. | |
| 2010/0121869 A1* | 5/2010 | Biannic | 707/759 |
| 2010/0146070 A1 | 6/2010 | McDowall | |
| 2010/0161577 A1* | 6/2010 | Morozov | 707/705 |
| 2010/0281017 A1* | 11/2010 | Hu | G06F 17/30442 707/718 |
| 2010/0287203 A1* | 11/2010 | Voznika et al. | 707/781 |
| 2011/0022596 A1* | 1/2011 | Wei et al. | 707/737 |
| 2011/0055201 A1* | 3/2011 | Burger | 707/719 |
| 2011/0099155 A1* | 4/2011 | Shau et al. | 707/693 |
| 2011/0191361 A1* | 8/2011 | Gupta | G06F 17/30424 707/763 |
| 2011/0246599 A1* | 10/2011 | Kawada | 709/212 |
| 2011/0295838 A1* | 12/2011 | Collins et al. | 707/715 |
| 2012/0011144 A1* | 1/2012 | Transier | G06F 17/3033 707/769 |
| 2012/0084782 A1* | 4/2012 | Chou et al. | 718/102 |
| 2012/0130989 A1* | 5/2012 | Corvinelli et al. | 707/718 |
| 2012/0136850 A1* | 5/2012 | Barsness et al. | 707/720 |
| 2012/0254214 A1* | 10/2012 | Lauer et al. | 707/758 |
| 2012/0311259 A1* | 12/2012 | Bondurant et al. | 711/115 |

OTHER PUBLICATIONS

Hellerstein et al., Online Aggregation, Jun. 1997, ACM, pp. 171-182.*

Dean et al., MapReduce: Simplified Data Processing on Large Clusters, Jan. 2008, ACM, vol. 51, No. 1, pp. 107-113.*

Beynon; et al., "DataCutter: Middleware for Filtering Very Large Scientific Datasets on Archival Storage Systems"—Published Date: Mar. 2000, http://citeseerx.ist.psu.edu/viewdoc/download?doi=10.1.1.35.1686&rep=rep1&type=pdf.

"International Search Report", dated Aug. 22, 2012, Application No. PCT/US2011/067307, Filed Date—Dec. 24, 2011, pp. 10.

Reply third Chinese Office Action cited in Chinese Application No. 2011104460212 dated Jan. 5, 2015, 2 pgs.

"First Office Action & Search Report Issued in Chinese Patent Application No. 201110446021.2", dated Jan. 26, 2014, 13 Pages.

"Second Office Action Issued in Chinese Patent Application No. 201110446021.2", dated Sep. 12, 2014, 6 Pages.

"Third Office Action and Search Report Issued in Chinese Patent Application No. 201110446021.2", dated Dec. 15, 2014, 12 Pages.

Japanese Office Action cited in Japanese Application No. 2013-547600 dated Dec. 1, 2015, 2 pgs.

Japanese Office Action cited in Japanese Application No. 2013-547600 dated Dec. 24, 2015, 2 pgs.

Japanese Notice of Allowance cited in Japanese Application No. 2013-547600 dated Jul. 15, 2016, 3 pgs.

Int. Preliminary Report cited in PCT Application No. PCT/US2011/067307 dated Jul. 2, 2013, 2 pgs.

Written Opinion cited in PCT Application No. PCT/US2011/067307 dated Aug. 22, 2012, 5 pgs.

Reply/Claims Chinese Office Action cited in Chinese Application No. 201110446021.2 dated Jun. 10, 2014, 9 pgs.

Reply/Claims second Chinese Office Action cited in Chinese Application No. 201110446021.2 dated Sep. 28, 2014, 8 pgs.

Chinese Notice of Allowance cited in Chinese Application No. 201110446021.2 dated May 6, 2015, 4 pgs.

"Office Action Issued in European Patent Application No. 11854242.2", dated May 23, 2017, 7 Pages.

"Supplementary Search Report Issued in European Patent Application No. 11854242.2", dated May 11, 2017, 3 Pages.

Acharya, et al., "Active Disks: Programming Model, Algorithms and Evaluation", In Proceedings of the Eighth International Conference on Architectural Support for Programming Languages and Operating Systems, Oct. 2, 1998, pp. 81-91.

Riedel, Erik, "Active Disks—Remote Execution for Network-Attached Storage", In a Dissertation Submitted to the Department of Electrical and Computer Engineering in Partial Fulfillment of the Requirements for the Degree of Doctor of Philosophy, Nov. 1, 1999, 204 Pages.

"Office Action Issued in Canadian Patent Application No. 2,822,900", dated Oct. 24, 2017, 5 Pages.

"Office Action Issued in Canadian Patent Application No. 2,822,900", dated May 28, 2018, 05 Pages.

* cited by examiner

FILTERING QUERIED DATA ON DATA STORES

BACKGROUND

Within the field of computing, many scenarios involve a query to be applied to a data set stored by one or more data stores. For example, a user or a data-driven process may request a particular subset of data by requesting from the data store a query specified in a query language, such as the Structured Query Language (SQL). The data store may receive the query, process it using a query processing engine (e.g., a software pipeline comprising components that perform various parsing operations on the query, such as associating names in the query with the named objects of the database and identifying the operations specified by various operators), apply the operations specified by the parsed query to the stored data, and return the query result that has been specified by the query. The query result may comprise a set of records specified by the query, a set of attributes of such records, or a result calculated from the data (e.g., a count of records matching certain query criteria). The result may also comprise a report of an action taken with respect to the stored data, such as a creation or modification of a table or an insertion, update, or deletion of records in a table.

In many such scenarios, the database may be distributed over several, and potentially a large number of, data stores. For example, in a distributed database, different portions of the stored data may be stored in one or more data stores in a server farm. When a query is received to be applied to the data set, a machine receiving the query may identify which data stores are likely to contain the data targeted by the query, and may send the query to one or more of those data stores. Each such data store may apply the query to the data stored therein, and may send back a query result. If the query was applied by two or more data stores, the query results may be combined to generate an aggregated query result. In some scenarios, one machine may coordinate the process of distributing the query to the involved data stores and aggregating the query results. Techniques such as the MapReduce framework have been devised to achieve such distribution and aggregation in an efficient manner.

The data engines utilized by such data stores may be quite sophisticated, and may be capable of applying many complicated computational processes to such data stores, such as database transactions, journaling, the execution of stored procedures, and the acceptance and execution of agents. The query language itself may promote the complexity of queries to be handled by the data store, including nesting, computationally intensive similarity comparisons of strings and other data types, and modifications to the structure of the database. Additionally, the logical processes applied by the query processing engine of a data store may be able to answer complicated queries in an efficient manner, and may even improve the query by using techniques such as query optimization. As a result of these and other processes, the evaluation of a query by a data store may consume a large amount of computational resources.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While it may be advantageous to equip a data store with a sophisticated query processing engine that is capable of processing sophisticated transactions, some disadvantages may also arise. In particular, it may be disadvantageous or inefficient to configure a data store to execute a complex query on locally stored data. For example, a data store happens to store data that is in particularly high demand, but the query processing engine may be taxed by the application of a complex query applied to the stored data while other queries (some of which may be very simple) remain pending. A complex query may therefore create a bottleneck that reduces the capacity and throughput of query evaluation.

As a second example, a distributed database architecture wherein a data store also executes sophisticated queries may compromise some security principles, since the machines that are storing the data are also permitted to execute potentially hazardous or malicious operations on the data. Additionally, the query processing engines may even permit the execution of arbitrary code on the stored data (e.g., an agent scenario wherein an executable module is received from a third party and executed against the stored data). A security principle that separates the storage of the data (on a first set of machines) and the execution of complex computation, including arbitrary code, on the data (allocated to a second set of machines) may present several security advantages, such as a data item partition between stored data and a compromised machine.

These and other advantages may arise from removing complex processing of data from the data stores (e.g., the machines of a server farm that are configured to store the data of a distributed database). However, it may also be disadvantageous to configure the data stores with no processing capabilities, e.g., as data stores functioning purely as data storage devices, which is capable only of providing a requested data object (e.g., an entire table) or make specified alterations thereto. For example, another machine may request from the data store only a subset of data, such as a subset of records from a table that satisfy a particular filter criterion. However, if the request specifies only a small number of records in a table containing many records, sending the entire table may be unduly inefficient, particularly given a bandwidth constraint between the machine and the data store in a networked environment.

Presented herein are techniques for configuring a data store to fulfill a request for data stored therein. In accordance with these techniques, the data store does not utilize a query processing engine that might impose significant computational costs, reduce performance in fulfilling requests, and/or permit the execution of arbitrary code on the stored data. However, the data store is also capable of providing only a subset of data stored therein. The data store achieves this result by accepting requests specifying one or more filter criteria, each of which reduces the requested amount of data in a particular manner. For example, the request may include a filter criterion specifying a particular filter criterion value, and may request only records having that filter criterion value for a particular filter criterion (e.g., in a data store configured to store data representing events, the filter criterion may identity a type of event or a time when the event occurred). The request therefore specifies only various filter criteria, and the data store is capable of providing the data that satisfy the filter criteria, but is not configured to process queries that may specify complex operations. This configuration may therefore promote the partitioning of a distributed database into a set of data nodes configured to store and provide data, and a set of compute nodes capable of applying complex queries (including arbitrary code).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
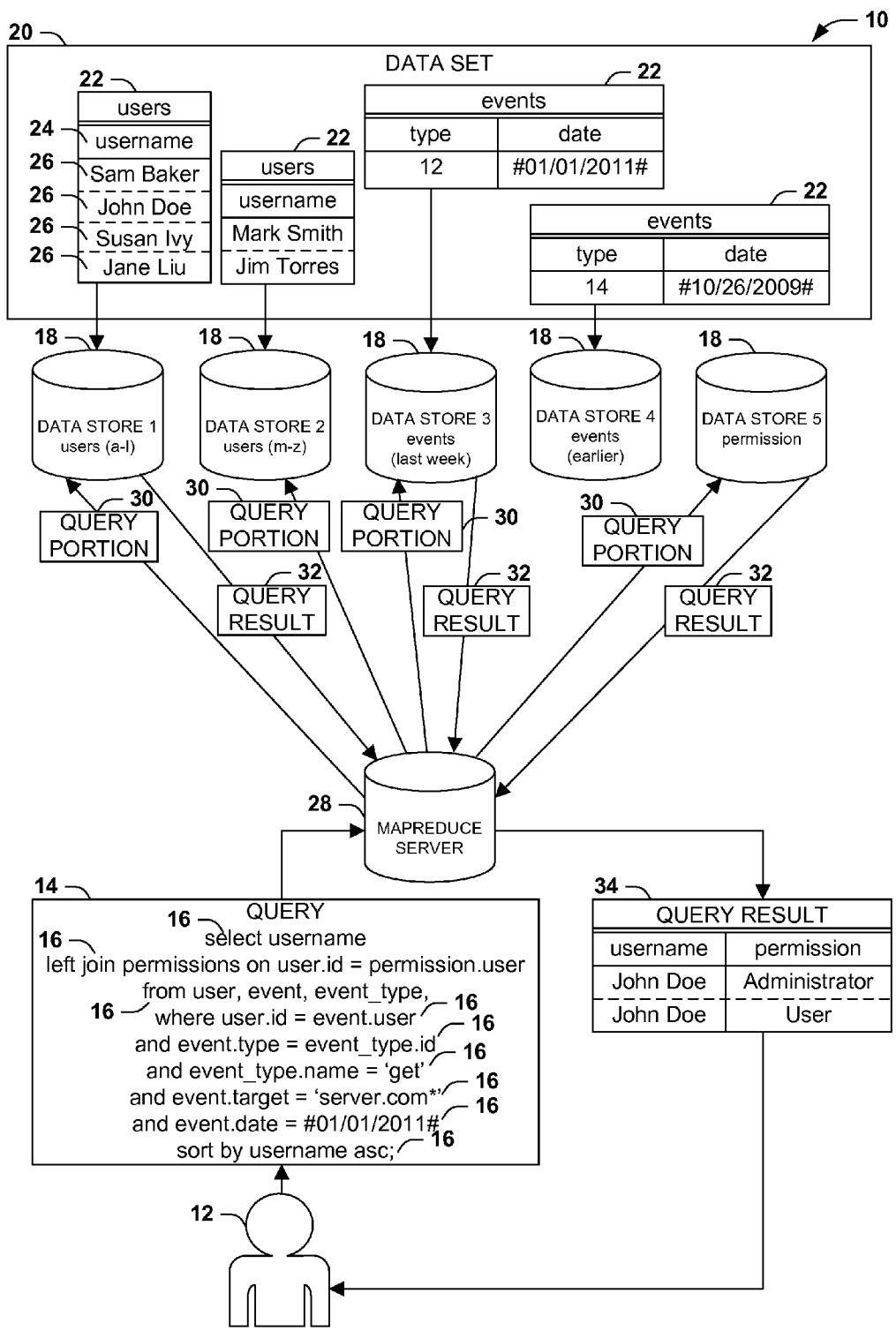
FIG. 1 is an illustration of an exemplary scenario featuring an application of a query to a data set distributed over several data stores.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a data set, such as a database stored by a data store. The data store may comprise a computer equipped with a storage component (e.g., a memory circuit, a hard disk drive, a solid-state storage device, or a magnetic or optical storage disc) whereupon a set of data is stored, and may be configured to execute software that satisfies requests to access the data that may be received from various users and/or processes. In many such scenarios, the stored data may be voluminous, potentially scaling to millions or billions of records stored in one table and/or a large number of tables, and/or complex, such as a large number of interrelationships among records and tables and sophisticated constraints serving as constraints upon the types of data that may be stored therein.

In some such scenarios, the data set may be stored on a plurality of data stores. As a first example, two or more data stores may store identical copies of the data set. This configuration may be advantageous for promoting availability (e.g., one data store may respond to a request for data when another data store is occupied or offline). As a second example, the data set may be distributed over the data stores, such that each data store stores a portion of the data set. This configuration may be advantageous for promoting efficiency (e.g., a distribution of the computational burden of satisfying a request for a particular set of data, such as a particular record, may be limited to the data store that is storing the requested data). In many such examples, dozens or hundreds of data stores may be provided, such as in a server farm comprising a very large number of data stores that together store and provide access to a very large data set.

FIG. 1 presents an exemplary scenario 10 featuring a first architecture for applying a query 14 submitted by a user 12 to a data set 20, comprising a set of data tables 22 each storing a set of records 26 having particular attributes 24. In this exemplary scenario 10, the data set 20 has been distributed across many data stores 18 in various ways. As a first example, the data set 20 may be vertically distributed; e.g., the data set 20 may comprise several data tables 22 storing different types of records 26, and a first data store 18 may store the records 26 of a first data table 22 while a second data store 18 may store the records 26 of a second data table 22. As a second example, the data set 20 may be horizontally distributed; e.g., for a particular data table 22, a first data store 18 may store a first set of records 26, while a second data store 18 may store a second set of records 26. This distribution may be arbitrary, or may be based on a particular attribute 24 of the data table 22 (e.g., for an attribute 24 specifying an alphabetic string, a first data store 18 may store records 26 beginning with the letters 'A' through 'L', while a second data store 18 may store records 26 beginning with the letters 'M' to 'Z'). Other ways of distributing the data tables 22 and data records 26 may also be devised; e.g., for a particular data table 22, a first data store 18 may store a first set of attributes 24 for the records 26 and a second data store 18 may store a second set of attributes 24 for the records 26, or two data stores 18 may redundantly store the same records 26 in order to promote the availability of the records 26 and the rapid evaluation of queries involving the records 26.

In many such scenarios, a user or process may submit a query to be applied to the data set 20. For example, a Structured Query Language (SQL) query may comprise one or more operations to be applied to the data set 20, such as selecting records 26 from one or more data tables 22 having particular values for particular attributes 24, projecting particular attributes 24 of such records 26, joining attributes 24 of different records 26 to create composite records 26, and applying various other operations to the selected data (e.g., sorting, grouping, or counting the records) before presenting a query result. The query may also specify various alterations of the data set 20, such as inserting new records 26, setting various attributes 24 of one or more records 26, deleting records 26, establishing or terminating relationships between semantically related records 26, and altering the layout of the data set 20, such as by inserting, modifying, or deleting one or more data tables 22. These operations may also be chained together into a set, sequence, or conditional hierarchy of such operations. Variants of the Structured Query Language also support more complex operations, such as sophisticated data searching (e.g., support for identifying records matching a regular expression), journaling (e.g., recording the application of operations that may later be reversed), and transactions (e.g., two or more operations where either are operations are performed successfully or none are applied). Still other variants of the Structured Query Language may support the execution of code on the data store; e.g., a query may specify or invoke a stored procedure that is to be executed by the data store on the stored data, or may include an agent, such as an interpretable script or executable binary that is provided to the data store for local execution. In order to evaluate and fulfill such queries, the data store 18 may comprise a query processing engine, such as a software pipeline comprising components that perform various parsing operations on the query, such as associating names in the query with the named objects of the database and identifying the operations specified by various operators. By lexically parsing the language of a query (e.g., identifying various components of the query according to the syntax rules of the query language), identifying the operations specified by each component of the query and the logical structure and sequence of the operations, and invoking a component that is capable of fulfilling the operation, the data store 18 may achieve the evaluation and fulfillment of the query.

In these and other scenarios, the task of applying a complex query to a data set distributed across many data stores may present many implementation challenges. Many techniques and architectural frameworks have been proposed to enable such application in an efficient and automated manner.

The exemplary scenario 10 of FIG. 1 further presents one technique that is often utilized to apply a query 14 to a data set 20 distributed across many data stores 18. In this exemplary scenario 10, a user 12 may submit a query 14 comprising a set of operations 16 that may be applied against the data set 20. Moreover, the operations 16 may be chained together in a logical sequence, e.g., using Boolean operators to specify that the results of particular operations 16 are to be utilized together. The query 14 may be delivered to a MapReduce server 28, comprising a computer configured to apply a "MapReduce" technique to distribute the query 14 across the data stores 18 that are storing various portions of the data set 20. For example, the MapReduce server 28 may identify that various operations 16 within the query 14 target various portions of the data set 20 that are respectively stored by particular data stores 18. For example, a first operation 16 may target the data stored by a first data store 18 (e.g., a Select operation applied to a data table 22 and/or set of records 26 stored by the first data store 18), while a second operation 16 may target the data stored by a second data store 18. Accordingly, the MapReduce server may decompose the query 14 into various query portions 30, each comprising one or more operations to be performed by a particular data store 18. The data store 18 may receive the query portion 30, apply the operations 16 specified therein, and generate a query result 32 that may be delivered to the MapReduce server 28 (or to another data store 18 for further processing). The MapReduce server 28 may then compose the query results 32 provided by the data stores 18 to generate a query result 34 that may be provided to the user 12 in response to the query 14. In this manner, the data stores 18 and the MapReduce server 28 may interoperate to achieve the fulfillment of the query 14.

The exemplary scenario 10 of FIG. 1 may present some advantages (e.g., an automated parceling out of the query 14 to multiple data stores 18, which may enable a concurrent evaluation of various query portions 30 that may expedite the evaluation of the query 14). However, the exemplary scenario 10 may also present some disadvantages. In particular, it may be desirable to devise an architecture for a distributed data set, such as a distributed database, wherein the storage and accessing of data is performed on a first set of devices, while complex computational processes are performed on a second set of devices. Such a partitioning may be advantageous, e.g., for improving the security of the data set 20. For example, queries 14 to be applied to the data set 20 may be computationally expensive (e.g., involving a large amount of memory), paradoxical (e.g., a recursive query that does not end or that cannot logically be evaluated), or malicious (e.g., overly or covertly involving an unauthorized disclosure or modification of the data set 20). In some scenarios, the computation may involve the execution of code, such as a query 14 that invokes a stored procedure that has been implemented on a data store 18, or mobile agent scenarios, wherein a third party may provide an "agent" (e.g., an interpretable script or partially or wholly compiled executable) that may be applied to the data set 20. Therefore, the security of the data set 20 may be improved by restricting complex computation to a particular set of computers that may be carefully monitored, and that may be suspended, taken offline, or replaced if such computers appear to be operating in ways that may damage the data set 20. However, the exemplary scenario 10 of FIG. 1 does not involve such partitioning. Rather, the data stores 18 that store various portions of the data set 20 also execute query portions 30 upon such data, and therefore fail to separate the accessing of the data set 20 from computation performed thereupon.

A second disadvantage that may arise in the exemplary scenario 10 of FIG. 1 involves the performance of the data set 20. For example, a particular data store 18 may be configured to store a query portion 30 that, temporarily or chronically, is frequently accessed, such that the data store 18 receives and handles many queries 14 involving the portion of the data set 20 in a short period of time. However, if the data store 18 is also configured to perform complex computational processing of the stored data, a query 14 involving complex operations may consume computing resources of the data store 18 (e.g., memory, processor capacity, and bandwidth) that may not be available to fulfill other queries 14. Therefore, a single complex query 14 may forestall the evaluation and fulfillment of other queries 14 involving the same data stored by the data store 18. By contrast, if complex computation involving this data were partitioned from the storage of such data, many computers may be configured to handle the queries 14 in parallel, and a complex query 14 that ties up the resources of one computer may not affect the evaluation or fulfillment of other queries 14 handled by other computers.

In view of these and other disadvantages that may arise from the architecture presented in the exemplary scenario 10 of FIG. 1, it may be desirable to separate the storage and accessing of data in a data set 20 from complex computational queries that may be applied to such data. However, a rigid partitioning, where the data store 18 only provides low-level access and a compute node provides all computation, may also be inefficient.

Figure 2:
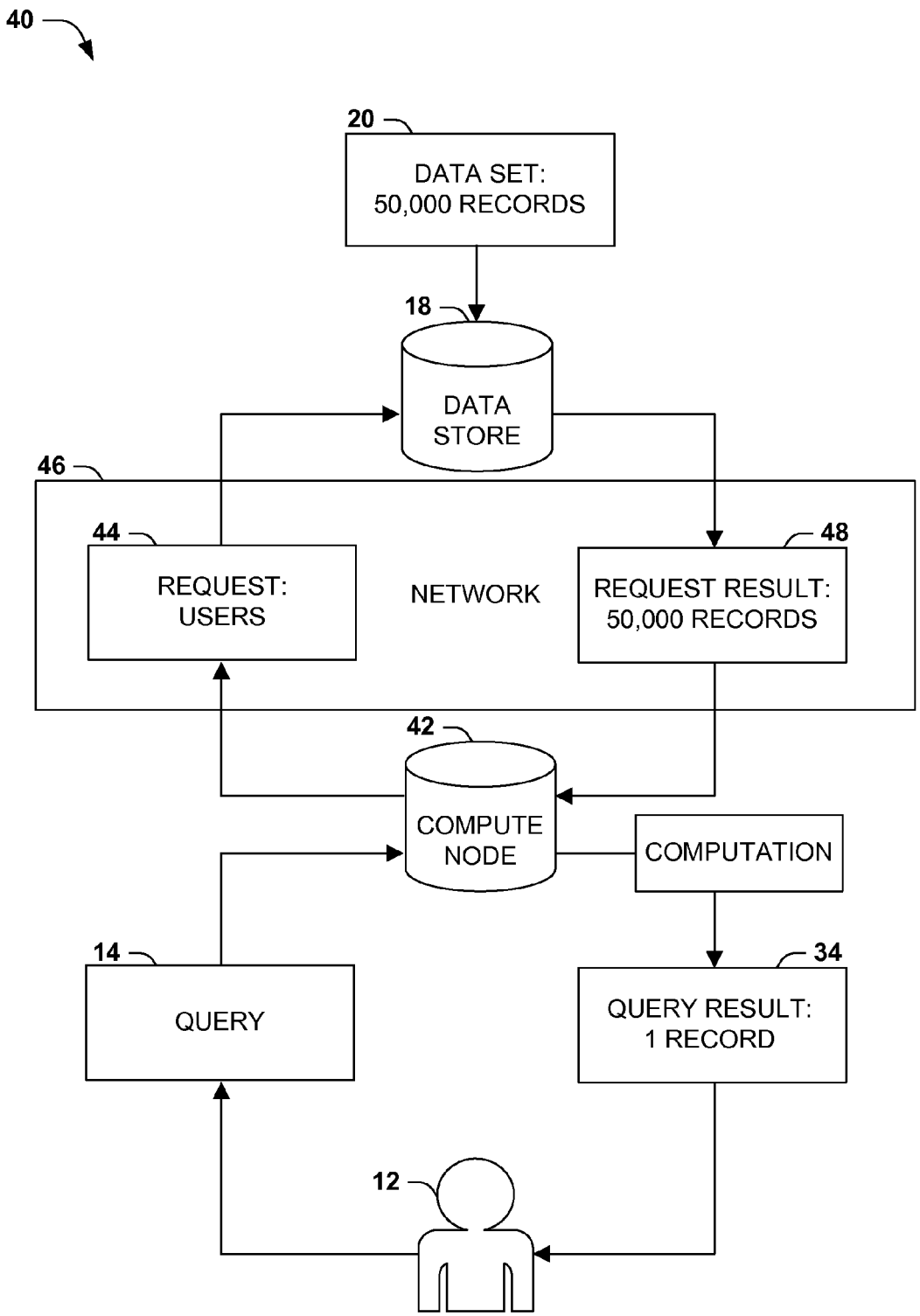
FIG. 2 is an illustration of an exemplary scenario featuring an application of a request for data from a data set stored by a data store.

FIG. 2 presents an exemplary scenario 40 wherein a data store 18 is configured to store a data set 20 comprising a large number of record 26 (e.g., 50,000 records). A user 12 may submit a query 14, which may be received and wholly evaluated by a compute node 42. The compute node 42 may comprise, e.g., a query processing engine, which may lexically parse the query 14, identify the operations 16 specified therein, and invoke various components to perform such operations 16, including retrieving data from the data store 18. For example, instead of sending a query 14 or a query portion 30 to the data store 18, the compute node 42 may simply send a request 44 for a particular set of records 26, such as the records 26 comprising a data table 22 of the data set 20. The data store 18 may respond with a request result 48, comprising the requested records 26, to which the compute node 42 may apply some complex computation (e.g., the operations 16 specified in the query 14) and may return a query result 34 to the user 12. However, this exemplary scenario 40 illustrates an inefficiency in this rigid partitioning of responsibilities between the compute node 42 and the data store 18. For example, the query 14 may request the retrieval of a single record 26 (e.g., a record 26 of an employee associated with a particular identifier), but the data table 22 stored by the data store 18 may include many such records 26. Accordingly, the data store 18 may provide a request result 48 comprising 50,000 records 26 to the compute node 42, even though only one such record 26 is included in the query result 34. Moreover, it may be easy to identify this record 26 from the scope of the query 14 (e.g., if the query 14 identifies the requested record 26 according to an indexed field having unique identifiers for respective records 26), but because the data store 18 cannot perform computations involved in the evaluation of the query 14, this comparatively simple filtering is not performed by the data store 18. This inefficiency may become particularly evident, e.g., if the request result 48 is sent to the compute node 42 over a network 46, which may have limited capacity. The sending of many records 26 over the network 46 may impose a rate-limiting factor on the completion of the query 14, thereby imposing a significant delay in the fulfillment of a comparatively simple query 14 involving a small query result 34. These and other disadvantages may arise from a hard partitioning of the responsibilities of data stores 18 and compute nodes 42 comprising a data set 20.

Presented herein are techniques for configuring a data set 20 to evaluate queries 14. These techniques may be devised, e.g., in view of the advantages and disadvantages in the exemplary scenario 10 of FIG. 2 and the exemplary scenario 40 of FIG. 2. In accordance with these techniques, a data store 18 may be configured to store one or more data items of a data set 20 (e.g., various tables 22, attributes 24, and/or records 26 of the data set 20), and to participate in the evaluation of a query 14 against such data items. As compared with the exemplary scenario 10 of FIG. 1, the data store 18 is not configured to evaluate a query 14; e.g., the data store 18 may not include a query processing engine, and may refuse to accept or evaluate queries 14 formulated in a query language, such as a Structured Query Language (SQL) query. Conversely, the data store 18 is not limited to providing one or more portions of the data store 20 in response to a request 44, which may cause inefficiencies arising from a rigid partitioning, such as illustrated in the exemplary scenario 40 of FIG. 2. Rather, in accordance with these techniques, the data store 18 is configured to accept requests 44 including one or more filtering criteria that define a filtered data subset. For example, the data store 18 may store one or more data tables 22 comprising various records 26, but a small number of attributes 24 for the records 26 may be indexed. The filtering may involve identifying, retrieving, and providing a data subset of the data set 20, comprising the records 26 having a particular value for one of the indexed attributes 24. Because the application of the filtering criterion to the data set 20 may result in a significant reduction of data to be sent in the filtered data subset 58 while consuming a small fraction of the computational resources involved in the evaluation of a query 14, the data store 18 may be configured to perform this filtering in response to the request 44. However, the data store 18 may be configured to refrain from performing more complex computational processes; e.g., the data store 18 may wholly omit a query processing engine, may refuse to accept queries 14 specified in a query language, or may reject requests 44 specifying non-indexed attributes 26. In this manner, the techniques presented herein may achieve greater efficiency and security than in the exemplary scenario 10 of FIG. 1, while also avoiding the disadvantages presented in the exemplary scenario 40 of FIG. 2.

Figure 3:
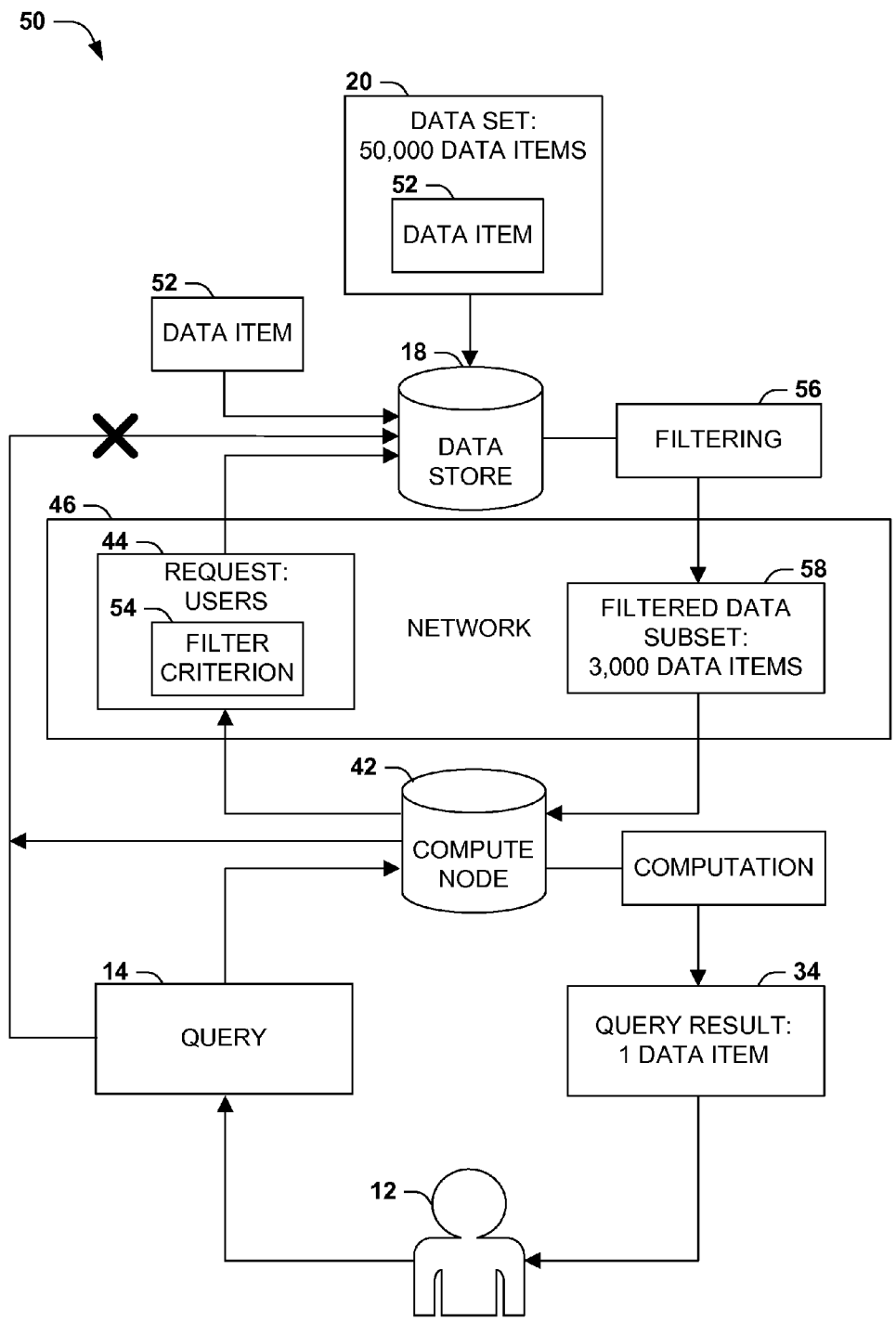
FIG. 3 is an illustration of an exemplary scenario featuring an application of a request featuring at least one filter criterion for data from a data set stored by a data store in accordance with the techniques presented herein.

FIG. 3 presents an illustration of an exemplary scenario 50 featuring an application of the techniques presented herein to apply a query 14 submitted by a user 12 to a data set 20 storing various data items 52 in order to generate and provide a query result 34. In this exemplary scenario 50, access to the data set 20 may be achieved through a data store 18, which, in turn, may be accessed through a compute node 42. However, if the user 12 or the compute node 42 were to submit the query 14 to the data store 18, the data store 18 may refuse to accept the query 14, or may be incapable of evaluating the query 14. (Alternatively, the data store 18 may accept and evaluate a query 14 only in particular circumstances, e.g., where the query 14 is submitted by an administrator.) Instead, the user 12 (or an automated process) may submit the query 14 to the compute node 42, which may endeavor to interact with the data store 18 to evaluate the query and provide a query result 34. In particular, the compute node 42 may examine the query 14 to identify a request 44 comprising one or more filter criteria 54 that may specify a retrieval of particular data items 52 from the data store 18. (e.g., identifying one or more operations 16 of the query 14 that may be expressed as a request 44 for data items 52 satisfying one or more filter criteria 54). The data store 18 is configured to receive data items 52 and store received data items 52 in a storage component (e.g., a memory circuit, a hard disk drive, a solid-state storage device, or a magnetic or optical disc) as part of the data set 20. Additionally, the data store 18 is configured to receive requests 44 comprising one or more filter criteria 54. Upon receiving a request 44, the data store 18 may perform a filtering 56 to identify the data items 52 that satisfy the filter criteria 54, and generate a filtered data subset 58 to be returned to the compute node 42. The compute node 42 may receive the filtered data subset 58 and may apply the remainder of the query 14 (e.g., performing complex computations specified by the operations 16 of the query 14 that were not expressed in the request 44). In some such scenarios, the compute node 42 may send a second or further request 44 to the data set 20 specifying other filter criteria 54, and may utilize the second or further filtered data subsets 58 in the computation. Eventually, the compute node 42 may generate a query result 34, which may be presented to the user 12 (or an automated process) in response to the query 14. In this manner, the configuration of the data store 18, and optionally the compute node 42, may enable the fulfillment of queries 14 in a more efficient and secure manner than presented in the exemplary scenario 10 of FIG. 1 and/or the exemplary scenario 40 of FIG. 2.

Figure 4:
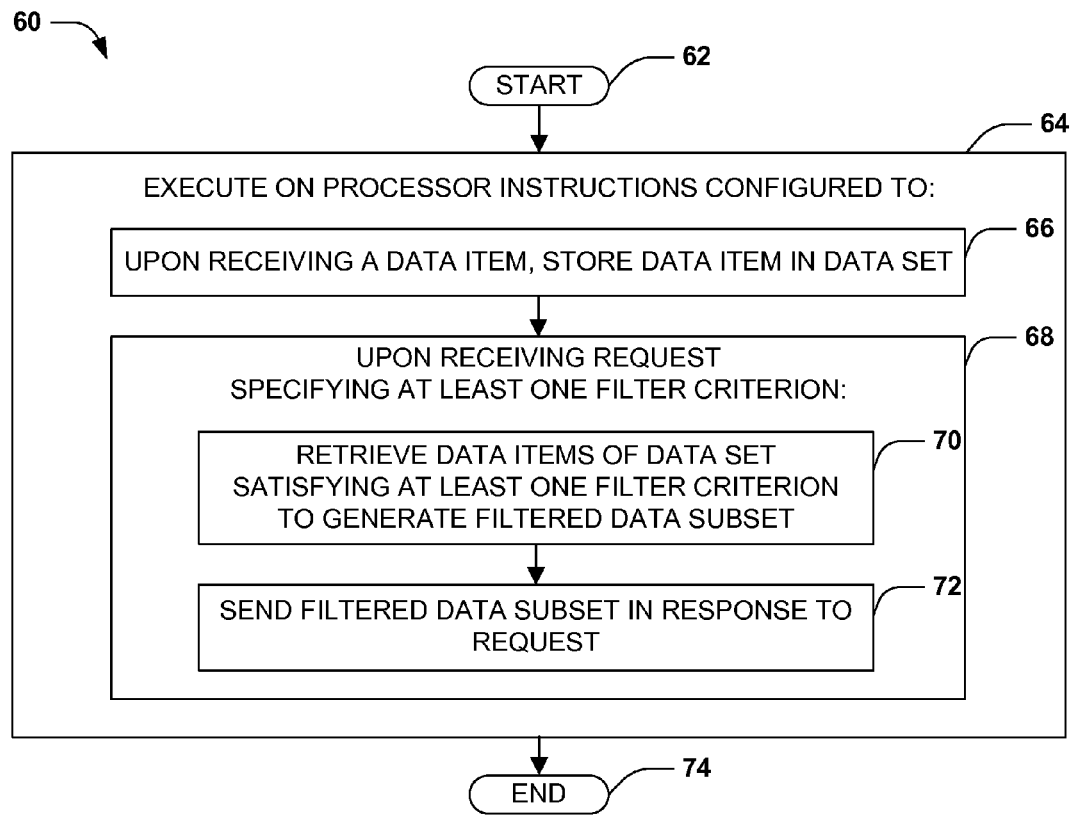
FIG. 4 is a flow chart illustrating an exemplary method of fulfilling requests targeting a data set of a data set.

FIG. 4 presents a first embodiment of these techniques, illustrated as an exemplary method 60 of fulfilling requests 44 targeting a data set 20. The exemplary method 60 may be performed, e.g., by a data store 18 configured to store or having access to part or all of the data set 20. Additionally, the exemplary method 60 may be implemented, e.g., as a set of software instructions stored in a memory component (e.g., a system memory circuit, a platter of a hard disk drive, a solid state storage device, or a magnetic or optical disc) of the data store 18, that, when executed by the processor of the data store 18, cause the processor to perform the techniques presented herein. The exemplary method 60 begins at 62 and involves executing 64 the instructions on the processor. More specifically, the instructions are configured to, upon receiving a data item 52, store 66 the data item 52 in the data set 20. The instructions are also configured to, upon receiving 68 a request 44 specifying at least one filter criterion 54, retrieve 70 the data items 52 of the data set 20 satisfying the at least one filter criterion to generate a filtered data subset 58, and to send 72 the filtered data subset 58 in response to the request 44. In this manner, the exemplary method 60 achieves the fulfillment of the request 44 to access the data set 20 without exposing the data store 18 to the security risks, inefficiencies, and consumption of computational resources involved in evaluating a query 14, and so ends at 74.

Figure 5:
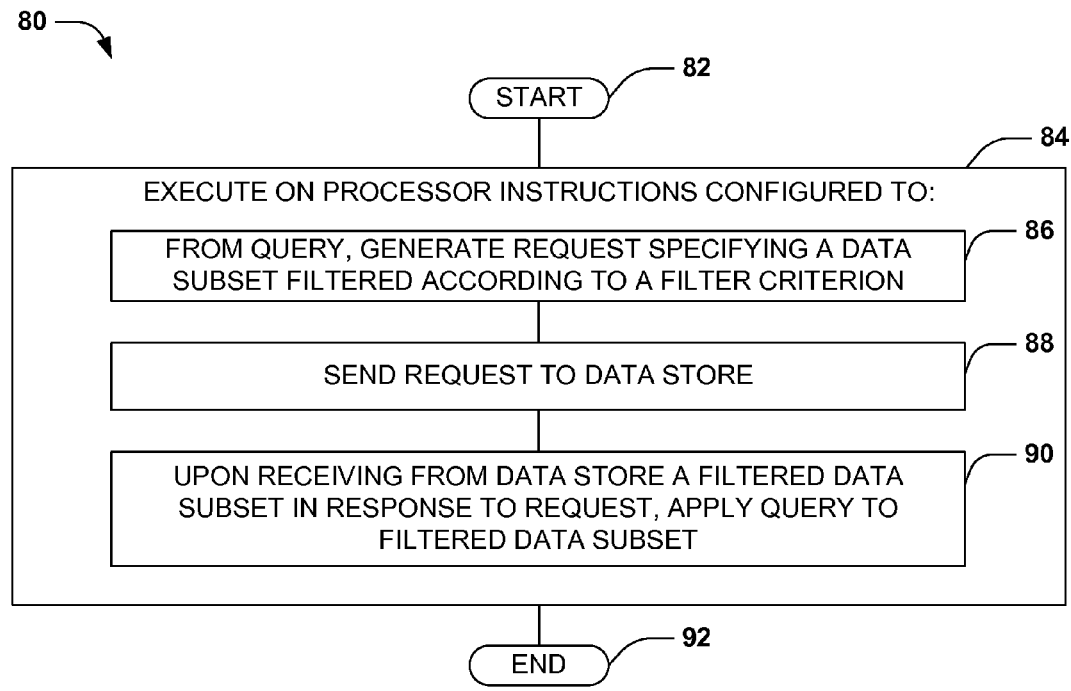
FIG. 5 is a flow chart illustrating an exemplary method of fulfilling requests targeting a data set of a data set.

FIG. 5 presents a second embodiment of these techniques, illustrated as an exemplary method 80 of applying a query 14 to a data set 20 stored by a data store 18. The exemplary method 80 may be performed, e.g., on a device, such as a compute node 42, having a processor. Additionally, the exemplary method 80 may be implemented, e.g., as a set of software instructions stored in a memory component (e.g., a system memory circuit, a platter of a hard disk drive, a solid state storage device, or a magnetic or optical disc) of the compute node 42 or other device, that, when executed by the processor, cause the processor to perform the techniques presented herein. The exemplary method 80 begins at 82 and involves executing 84 the instructions on the processor. More specifically, the instructions are configured to, from the query 14, generate 86 a request 44 specifying at least one filter criterion 54. The instructions are also configured to send 88 the request 44 to the data store 18, and, upon receiving from the data store 18 a filtered data subset 58 in response to the request 44, apply 90 the query 14 to the filtered data subset 56. In this manner, the exemplary method 80 achieves the fulfillment of a query 14 to the data set 20 without exposing the data store 18 to the security risks, inefficiencies, and consumption of computational resources involved in evaluating the query 14, and so ends at 92.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
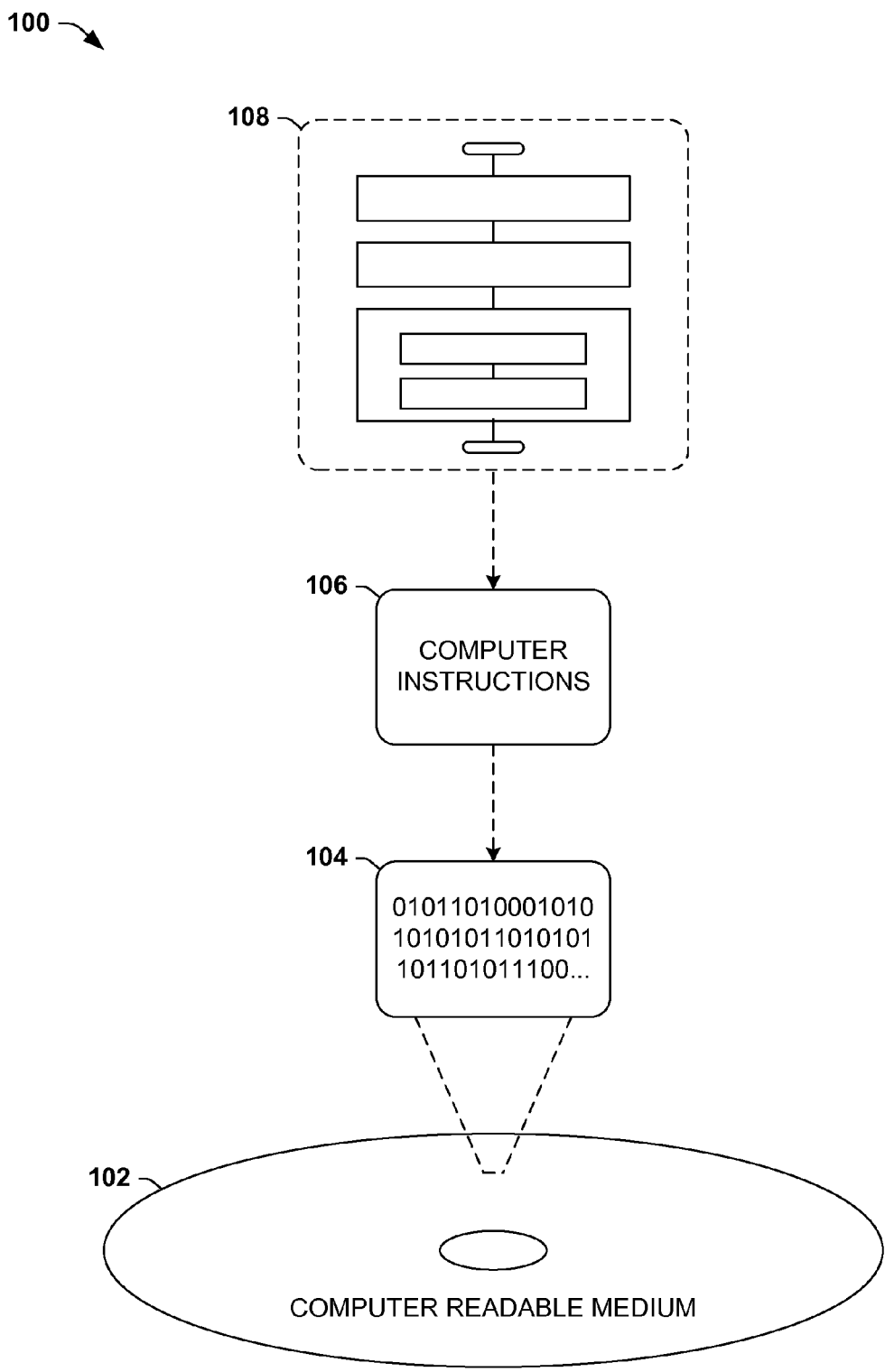
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of fulfilling requests targeting a data set of a data set, such as the exemplary method 60 of FIG. 4. In another such embodiment, the processor-executable instructions 106 may be configured to implement a method of applying a query to a data set stored by a data store, such as the exemplary method 80 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 4 and the exemplary method 80 of FIG. 5) to confer individual and/or synergistic advantages upon such embodiments.

A first aspect that may vary among embodiments of these techniques relates to the scenarios wherein such techniques may be utilized. As a first variation, many types of data stores 18 (and/or compute nodes 42) may be utilized to apply the queries 14 and requests 44 to a data set 20. As one such example, the data stores 18 and/or compute nodes 42 may comprise distinct hardware devices (e.g., different machines or computers), distinct circuits (e.g., field-programmable gate arrays (FPGAs)) operating within a particular hardware device, or software processes (e.g., separate threads) executing within one or more computing environments on one or more processors of a particular hardware device. The data stores 18 and/or compute nodes 42 may also comprise virtual processes, such as distributed processes that may be incrementally executed on various devices of a device set. Additionally, respective data stores 18 may internally store the data items 52 comprising the data set 20, or may have access to other data stores 18 that internally store the data items 52 (e.g., a data access layer or device interfacing with a data storage layer or device). As a second variation, many types of data sets 20 may be accessed using the techniques presented herein, such as a database, a file system, a media library, an email mailbox, an object set in an object system, or a combination of such data sets 20. Similarly, many types of data items 52 may be stored in the data set 20. As a third variation, the queries 14 and/or requests 44 evaluated using the techniques presented herein may be specified in many ways. For example, a query 14 may be specified according to a Structured Query Language (SQL) variant, as a language-integrated query (e.g., a LINQ query), or an interpretable script or executable object configured to perform various manipulations of the data items 52 within the data set 20. The request 44 may also be specified in various ways, e.g., simply specifying an indexed attribute 24 and one or more values of such attributes 24 of data items 52 to be included in the filtered data subset 58. While the request 44 is limited to one or more filter criteria 54 specifying the data items 52 to be included in the filtered data subset 58, the language, syntax, and/or protocol whereby the query 14 and request 44 are formatted may not significantly affect the application or implementation of the techniques presented herein.

A second aspect that may vary among embodiments of these techniques relates to the storing of data items 52 in the data set 20 by the data store 18. As a first variation, a data store 18 may comprise at least one index, which may correspond to one or more filter criteria 54 (e.g., a particular attribute 24, such that records 26 containing one or more values for the attribute 24 are to be included in the filtered data subset 58). A data store 18 may be configured to, upon receiving a data item 52, index the data item in the index according to the filter criterion 54 (e.g., according to the value of the data item 52 for one or more attributes 24 that may be targeted by a filter criterion 54). The data store 18 may then be capable of fulfilling a request 44 by identifying the data items 52 satisfying the filter criteria 54 of the request 44 by using an index corresponding to the filter criterion 54. It may be advantageous to choose attributes 24 of the data items 52 for indexing that are likely to be targeted by filter criteria 54 of requests 44, and to refrain from indexing the other attributes 24 of the data items 52 (e.g., indices have to be maintained as data items 52 change, and it may be disadvantageous to undertake the computational burden of such maintenance in order to index an attribute 24 that is not likely to be frequently included as a filter criterion 54). For example, in a database configured to track events performed by various users at various times, it may be desirable to configure a data store 18 to generate and maintain indices for an index set comprising an event index specifying an represented by respective data items 52; a time index specifying a time of an event represented by respective data items 52; and a user index specifying at least one user associated with an event represented by respective data items 52. However, it may not be desirable to generate and maintain indices for other attributes 24 of this data set 20, such as a uniform resource identifier (URI) of a digital resource involved in the request, a comment field whereupon textual comments regarding particular events may be entered by various users and administrators, or a "blob" field involving a large data set involved in the event (e.g., a system log or a captured image that depicts the event).

As a further variation of this second aspect, the index may identify data items 52 associated with one or more particular filter criterion values for a particular filter criterion 54 in various ways. As one such example, an index may specify, for a filter criterion value of a filter criterion 54 corresponding to the index, a data item set that identifies the data items having the filter criterion value for the filter criterion 54. For example, the index may store, for each filter criterion value of the filter criterion 54, a set of references to the data items 52 associated with the filter criterion value. Additionally, the data item set stored in the index may be accessible in various ways. For example, the index may permit incremental writing to the data item set (e.g., indexing a new data item 52 by adding the data item 52 to the data item set of data items having the filter criterion value for the filter criterion), but may permit only atomic reading of the data item set (e.g., for a request 44 specifying a particular filter criterion value for a particular filter criterion 54, the index may read and present the entire data item set, comprising the entire set of references to such data items 52). As a further variation, the data store 18 may, upon receipt of respective data items 52, store the data items 52 in a data item buffer, such that, when the data item buffer exceeds a data item buffer size threshold (e.g., the capacity of the data item buffer), the data store 18 may add the data items to respective data item sets and empty the data item buffer.

Figure 7:
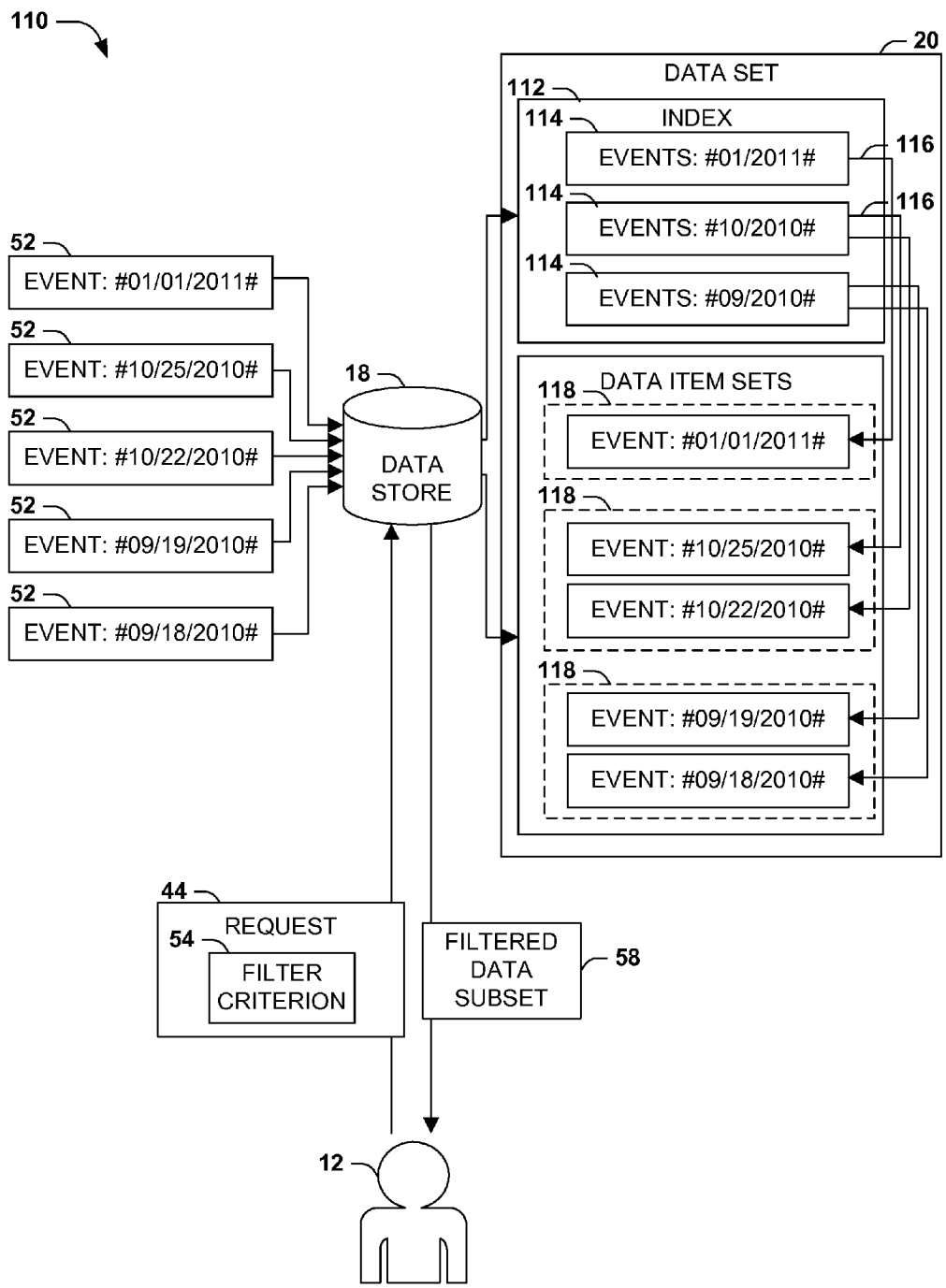
FIG. 7 is an illustration of an exemplary scenario featuring an indexing of data items stored by a data set.

FIG. 7 presents an illustration of an exemplary scenario 110 featuring an indexing of data items 52 in one or more data item sets 118 indexed according to an index 112. In this exemplary scenario 110, the data store 18 may receive various data items 52 (e.g., a set of reported events) and may store such data items 52 in a data set 20. In particular, the data store 18 may generate an index 112, comprising a set of index entries 114 including references 116 to one or more data items 52 of one or more data item sets 118, each corresponding to a different filter criterion value for a filter criterion 54 (e.g., the month and year of a date when an event occurred). Upon receiving a data item 52, the data store 18 may identify one or more filter criterion values of the data item 52, and may store a reference to the data item 52 stored in an index entry 114 of the index 112 corresponding to the filter criterion value. The data store 18 may then store the data item 52 in the data set 20 (e.g., by appending the data item 52 to a list of records 26). When a user 12 submits a request 44 to a data store 18 (either directly or indirectly, e.g., by submitting a query 14 to a compute node 42 that is configured to generate from the query 14 a request 44 specifying one or more filter criteria 54), the data store 18 may fulfill the request 44 by retrieving a data item set 118 associated with the filter criterion value, and in particular may do so by identifying the index entry 114 of the index 112 identifying the data items 52 of the data item set 118 corresponding to the filter criterion value. The data store 18 may then use the references 116 stored in the index entry 114 to retrieve the data items 52 of the data item set 118, and may send such data items 52 as the filtered data subset 58. In this manner, even if the data items 52 are stored together in an arbitrary manner, the data store 18 may fulfill the request 44 in an efficient manner by using the index 112 corresponding to the filter criterion 54 of the request 44. For example, respective index entries 114 of an index 112 may store, for a first filter criterion value of a filter criterion 54, references to data item partitions corresponding to respective second filter criterion values of a second filter criterion 54. Data items 52 may be stored and/or retrieved using this two-tier indexing technique. For example, storing a data item 52 may involve using the index 112 to identify the index entry 114 associated with a first filter criterion value of a first filter criterion 54 for the data item 52, examining the data item partitions referenced by the index entry 114 to identify the data item partition associated with a second filter criterion value of a second filter criterion 54 for the data item 52, and storing the data item 52 in the data item partition. Conversely, retrieving data items 52 having a particular first filter criterion value of a first filter criterion 54 and a particular second filter criterion value of a second filter criterion 54 may involve using the index 112 to identify the index entry 114 associated with the first filter criterion value; examining the data item partitions referenced in the index entry 114 to identify the data item partition associated with the second filter criterion value; and retrieving and sending the data item partition in response to the request 44.

As a further variation of this second aspect, a data store 18 may configure an index as a set of partitions, each including the data items 52 (or references thereto, e.g., a memory reference or URI where the data item 52 may be accessed, or a distinctive identifier of the data item 52, such as a key value of a key field of a data table 22) satisfying a particular filter criterion 54. For example, the data store 18 may generate various partitions, such as small sections of memory allocated to store data items 52 having a particular filter criterion value of a particular filter criterion 54. Upon receiving a data item 52, the data store 18 may store the data item 52 in the corresponding partition; and upon receiving a request 44 specifying a filter criterion value of a particular filter criterion 54, the data store 18 may the data item partition storing the data items 52 having the filter criterion value for the filter criterion, and send the data item partition as the filtered data subset 58. As a still further variation, two or more indices may be utilized to group data items according to two or more filter criteria 54.

Figure 8:
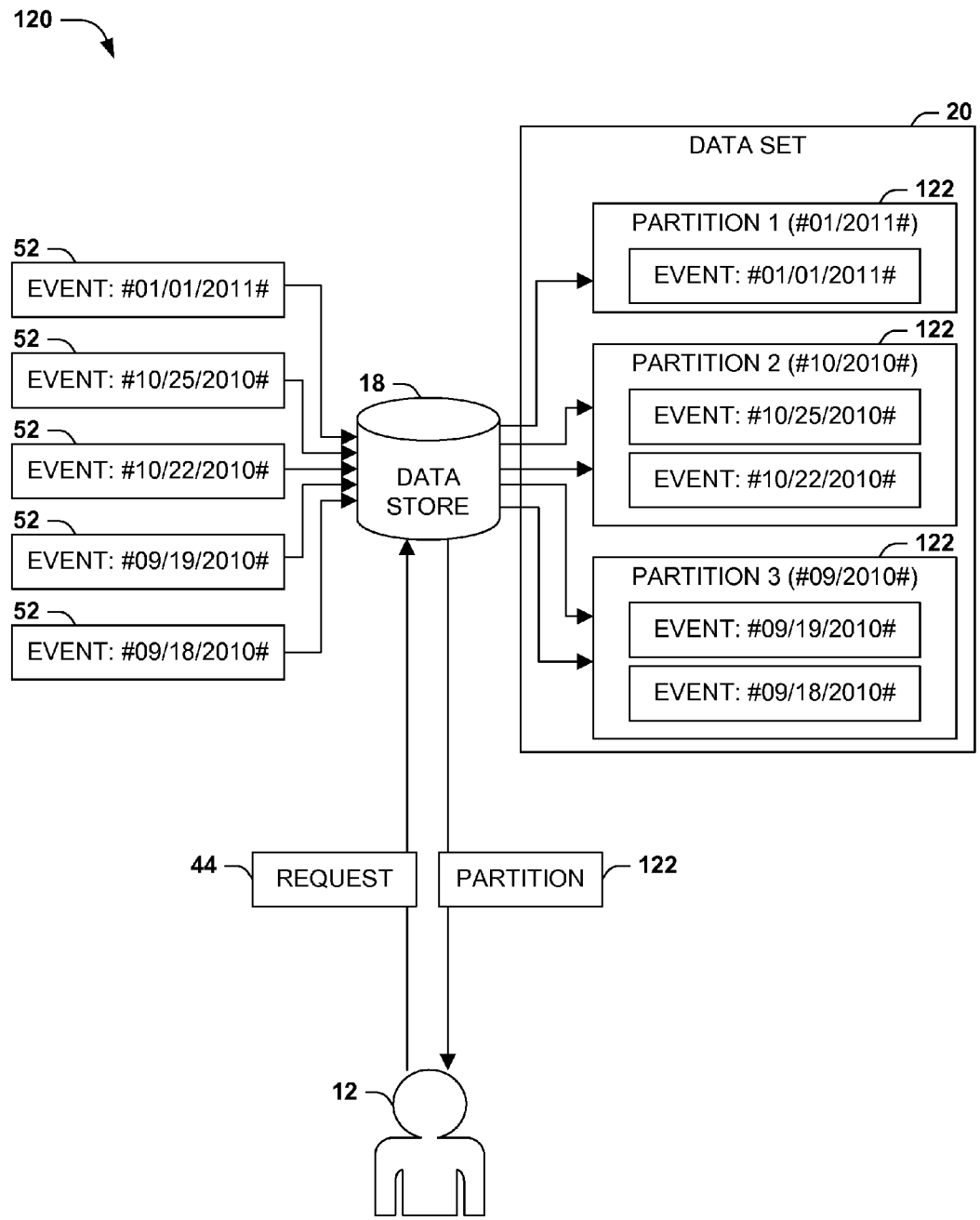
FIG. 8 is an illustration of an exemplary scenario featuring a partitioning of data items stored by a data set.

FIG. 8 presents an illustration of an exemplary scenario 120 featuring a partitioning of data items 52 into respective data item partitions 122. In this exemplary scenario 120, the data store 18 may receive various data items 52 (e.g., a set of reported events) and may store such data items 52 in a data set 20. The data store 18 may again generate an index 112 (not shown), comprising a set of index entries 114 including references 116 to one or more data items 52 of one or more data item sets 118, each corresponding to a different filter criterion value for a filter criterion 54 (e.g., the month and year of a date when an event occurred). However, in contrast with the exemplary scenario 110 of FIG. 7, in this exemplary scenario 120 the data items 52 are stored in a manner that is partitioned according to the filter criterion value. Upon receiving a data item 52, the data store 18 may identify one or more filter criterion values of the data item 52, and may identify a data item partition 122 associated with the filter criterion value. The data store 18 may then store the data item 52 in the data item partition 122 corresponding to the filter criterion value. When a user 12 submits a request 44 to a data store 18 (either directly or indirectly, e.g., by submitting a query 14 to a compute node 42 that is configured to generate from the query 14 a request 44 specifying one or more filter criteria 54), the data store 18 may fulfill the request 44 by retrieving a data item set 118 associated with the filter criterion value, and in particular may do so by identifying the data item partition 122 associated with the filter criterion value. The data store 18 may then retrieve the entire data item partition 122, and may send the entire data item partition 122 to the user 12. Additional data item partitions 122 may be retrieved and send in response to other filter criteria 54 (e.g., two or more filter criterion values for a particular filter criterion 54, or a filter criterion value specified in the alternative for each of two or more different filter criteria 54). In this manner, the data store 18 may identify and provide the data items 52 satisfying the filter criterion 54 in an efficient manner by using the data item indices 122 corresponding to one or more filter criteria 54 specified in the request 44. Those of ordinary skill in the art may devise many ways of storing data items 52 of a data set 20 in accordance with the techniques presented herein.

A third aspect that may vary among embodiments of these techniques involves the configuration of a data store 18 and/or a compute node 42 to retrieve data items 52 satisfying the filter criteria 54 of a request 44. As a first variation, the request 44 may comprise many types of filter criteria 54. In particular, the request 44 may specify a first filtered data subset 58 that may relate to the data items 52 comprising a second filtered data subset 58, and the data store 18 may utilize the first filtered data subset 58 while generating the second filtered data subset 58. For example, a query 14 may involve a request 44 specifying another filtered data subset 58 (e.g., in the query 14 "select username from users where user.id in (10, 22, 53, 67)", a request 44 is filtered according to a set of numeric user IDs presented as a filtered data subset 58). As a further variation, a query 14 may involve a first request 44 specifying a first filtered data subset 58, which may be referenced in a second request 44 specifying a second filtered data subset 58. For example, in the query 14 "select username from users where user.id in (select users from events where event.type=12")", a first filtered data subset 58 is generated from the events data table (using a first request 44, e.g., "SET_1=event.type=12"), and the first filtered data subset 58 is referenced by a second request 44 (e.g., "user.id in SET_1"), resulting in a second filtered data subset 58. In this manner, a request 44 may reference a filtered data subset 58 generated by another request 44, including an earlier request 44 provided and processed while evaluate the same query 14.

As a second variation of this third aspect, when presented with a request 44 including at least one filter criterion 54, a data store 18 may be configured to retrieve from the data set 20 the content items 52 satisfying respective filter criteria 54 of the request 44 (e.g., by utilizing an index 112 to identify a data set 118 and/or data item partition 122, as in the exemplary scenario 110 of FIG. 7 and the exemplary scenario 120 of FIG. 8). Alternatively, rather than utilizing an index, the data store 18 may retrieve all of the data items 52 of the data set 20, and may send (e.g., to a compute node 42 or user 12 submitting the request 44 to the data store 18) only the data items 52 satisfying the at least one filter criterion. In the former example, the filter of data items 52 is achieved during the indexing of the data items 52 upon receipt; but in the latter example, the filtering of data items 52 is achieved during the sending of the data items 52. It may be difficult to filter all of the data items 52 in realtime, e.g., in order to fulfill a request 44. However, some techniques may be utilized to expedite the realtime filtering of the data items 52, alternatively or in combination with the use of indices 112 and/or partitions 122.

Figure 9:
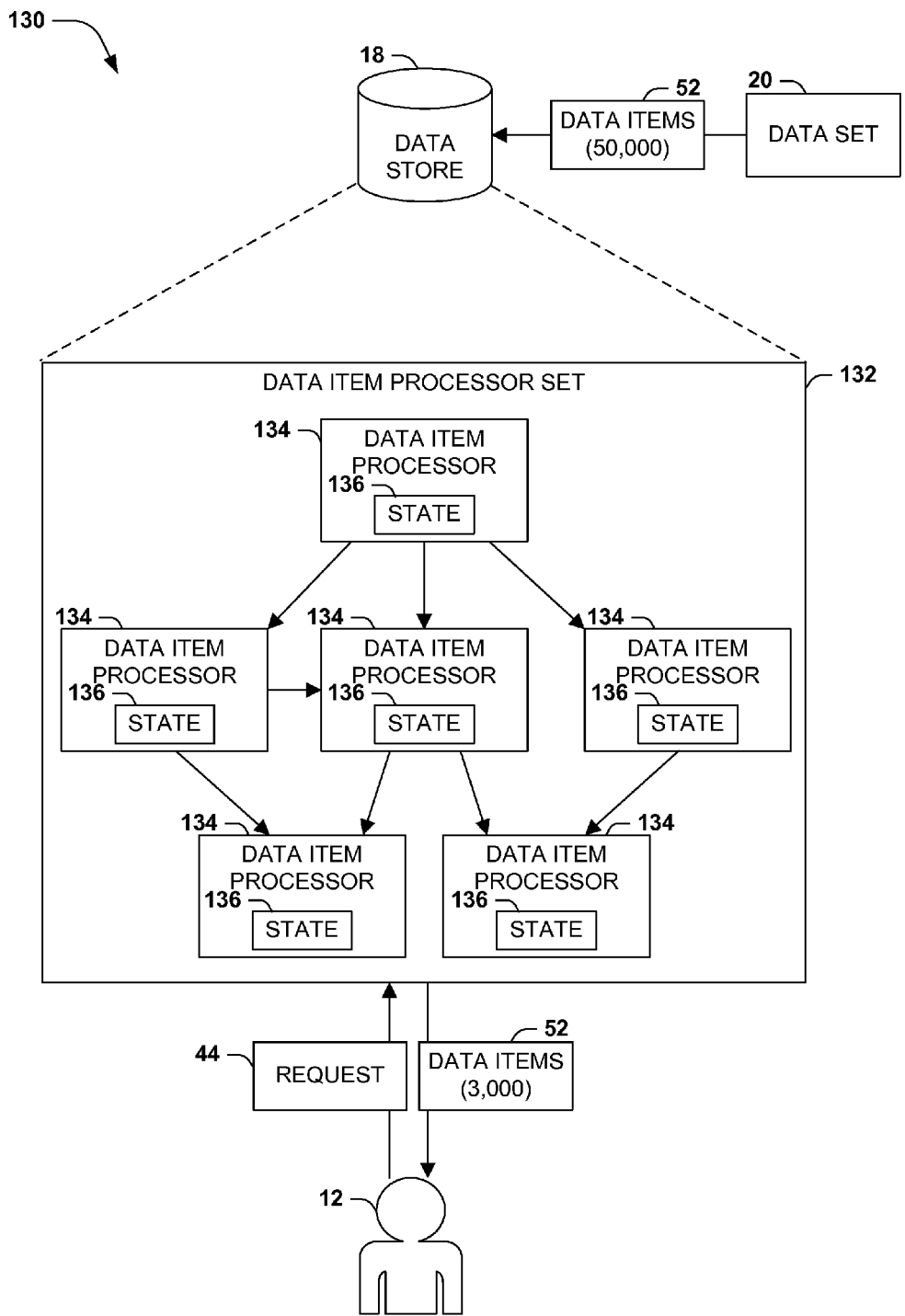
FIG. 9 is an illustration of an exemplary scenario featuring a data item processor set comprising data item processors configured to filter data items in response to a request featuring at least one filter criterion.

FIG. 9 presents an illustration of an exemplary scenario 130 featuring one technique for implementing a realtime filtering of data items 52. In this exemplary scenario 130, a data store 18 receives from a user 12 a request 44 specifying at least one filter criterion 54, and endeavors to fulfill the request 44 by providing a filtered data subset 58 comprising only the data items 52 satisfying the filter criteria 54 of the request 44. However, in this exemplary scenario 130, the data store 18 retrieves all of the data items 52 from the data set 20, and then applies a data item processor set 132 to the entire set of data items 52 in order to identify and provide only the data items 52 satisfying the filter criteria 54. The data item processor set 132 may comprise, e.g., a set of data item processors 134, each having a state 136 and at least one filtering condition (e.g., a logical evaluation of any particular data item 52 to identify whether or not a filtering criterion 54 is satisfied). The data item processors 134 may be individually configured to, upon receiving a data item 52, update the state 136 of the data item processor 134; and when the state 136 of the data item processor 134 satisfies the at least one filtering condition, the data item processor 134 may authorize the data item 52 to be sent (e.g., by including the data item 52 in the filtered data subset 58, or by sending the data item 52 to a different data item processor 134 for further evaluation). The data item processors 134 may therefore be interconnected and may interoperate, e.g., as a realtime processing system that evaluates data items 52 using a state machine. Accordingly, the data store 18 may invoke the data item processor set 132 upon the data items 52 retrieved from the data set 20, and may send only the data items 52 that have been authorized to be sent by the data item processor set 132. In this manner, the data store 18 may achieve an ad hoc, realtime evaluation of all data items 52 of the data set 20 to identify and deliver the data items 52 satisfying the filter criteria 54 of the request 44 without having to generate, maintain, or utilize indices 112 or partitions 122.

As a third variation of this third aspect, the data store 18 may, before providing a filtered data subset 58 in response to a request 44 (and optionally before retrieving the data items 18 matching the filter criteria 54 of the request 44), estimate the size of the filtered data subset 58. For example, a request 44 received by the data store 18 may involve a comparatively large filtered data subset 58 that may take a significant amount of computing resources to retrieve and send in response to the request 44. Therefore, for requests 44 received from a requester (e.g., a particular user 12 or automated process), an embodiment may first estimate a filtered data subset size of the filtered data subset 58 (e.g., a total estimated number of records 26 or data items 52 to be included in the filtered data subset 58), and may endeavor to verify that the retrieval of the filtered data subset 58 of this size is acceptable to the requester. Accordingly, an embodiment may be configured to, before sending a filtered data subset 58 in response to a request 44, estimate the filtered data subset size of the filtered data subset 58 and send the filtered subset data size to the requester, and may only proceed with the retrieval and sending of the filtered data subset 58 upon receiving a filtered data subset authorization from the requester. Conversely, a compute node 42 may be configured to, after sending a request 44 specifying at least one filter criterion 54 and before receiving a filtered data subset 58 in response to the request 44, receive from the data store 18 an estimate of a filtered data subset size of the filtered data subset 58, and may verify the filtered data subset size (e.g., by presenting the filtered data subset size to a user 12, or by comparing the filtered data subset size with an acceptable filtered data subset size threshold, defining an acceptable utilization of computing resources of the data store 18 and/or network 46). If the estimated filtered data subset size is acceptable, the compute node 42 may generate and send to the data store 18 a filtered data subset authorization, and may subsequently receive the filtered data subset 58. Those of ordinary skill in the art may devise many ways of configuring a data store 18 and/or a compute node 42 to retrieve data items 52 from the data set 20 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module", "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
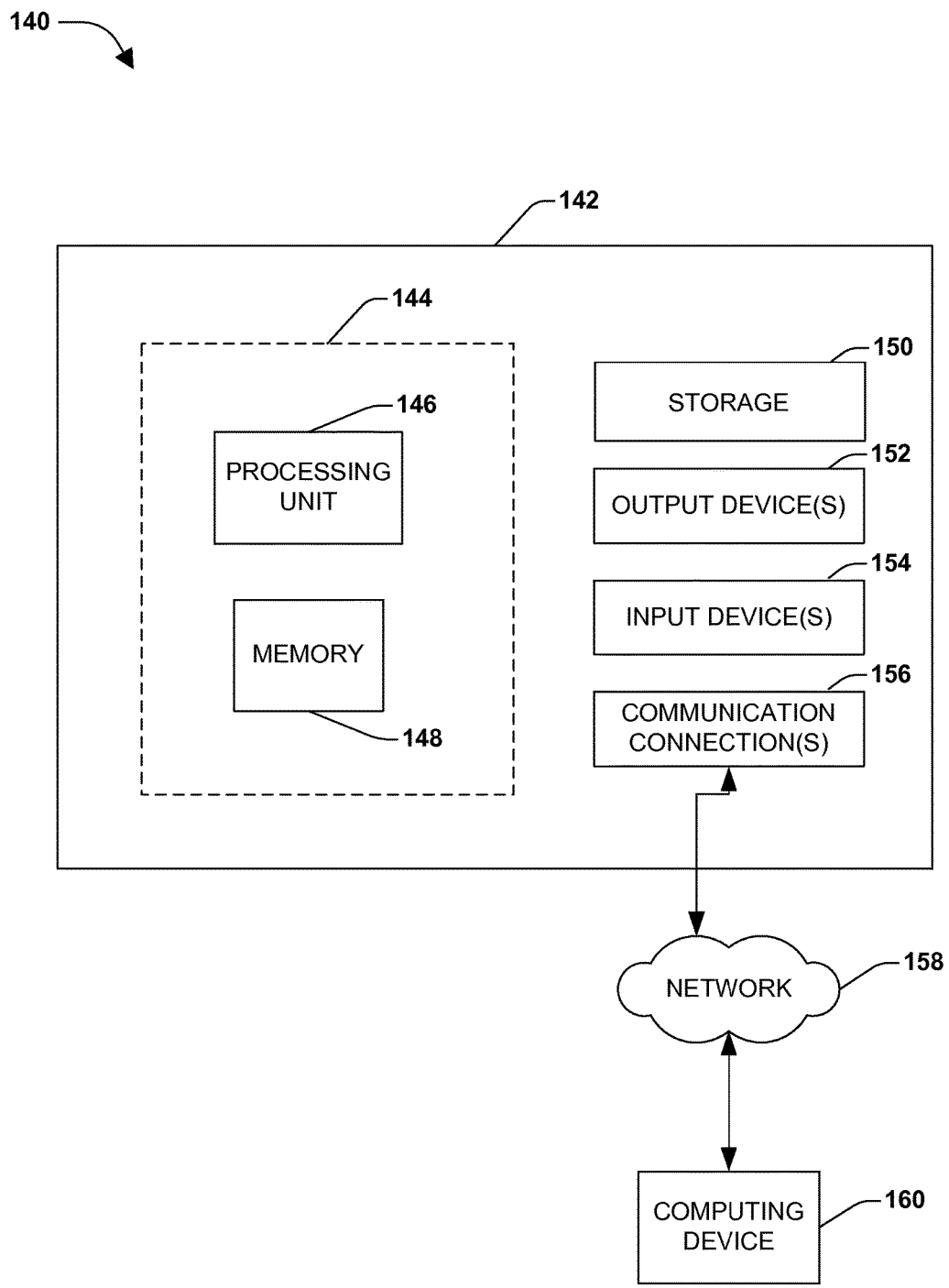
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 10 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 10 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of fulfilling queries targeting a data set comprising a set of records that are stored in a data store accessible to a computer having a processor, the method comprising:

executing, on the processor, instructions that cause the computer to:

receive a query targeting the data set, wherein the query specifies a set of selected attributes of the data set and a computation to be applied only to a portion of the data set that matches at least one filter criterion;

partition the query into a filter portion that filters the data set into a filtered data subset according to the at least one filter criterion, and a computation portion specifying at least one computation to be performed only on the filtered data subset of the data store;

according to the filter portion of the query, generate a filtering request to retrieve a filtered data subset comprising a first portion of the data set satisfying the at least one filter criterion and excluding a second portion of the data set not satisfying the at least one filter criterion, according to the at least one filter criterion distinguishing the first portion from the second portion of the data set;

send the generated filtering request to the data store to cause the data store to return the selected attributes of all records satisfying the filter criterion and exclude all records not satisfying the filter criterion; and responsive to receiving the selected attributes of the filtered data subset from the data store responsive to the filtering request, apply the computation portion of the query to the filtered data subset.

2. The method of claim 1, wherein:

the data store further comprises an index that specifies, for a filter criterion value of the filter criterion, a data item set identifying the data items of the data set having the filter criterion value for the filter criterion, wherein the index is selected from an index set further comprising:
an event index specifying an event represented by respective data items;
a time index specifying a time of an event represented by respective data items; and
a user index specifying at least one user associated with an event represented by respective data items; and the filtering request further specifies the filter criterion that is indexed by the index stored by the data store.

3. The method of claim 1, wherein:

the data store further comprises a data item buffer that stores received data items; and storing the data item further comprises: for the data items stored in the data item buffer exceeding a data item buffer size threshold:
adding respective data items of the data item buffer in the data item set, and
emptying the data item buffer.

4. The method of claim 1, wherein:

the data store further comprises at least one data item partition that stores data items having a filter criterion value for a filter criterion; and invoking the data store with the request further comprises:
for at least one filter criterion value for respective filter criteria, invoking the data store with the data item partition storing data items having the filter criterion value for the filter criterion.

5. The method of claim 4, wherein executing the instructions further causes the computer to, responsive to receiving a data item:
identify at least one filter criterion value for at least one filter criterion that is indexed by an index used by the data store;
identify a data item partition storing data items having the filter criterion value for the filter criterion; and
store the data item in the data item partition.

6. The method of claim 5, wherein storing a data item further comprises:
identifying a first filter criterion value of the data item for the first filter criterion;
using the index, identifying the data item partitions storing data items having the first filter criterion value for the first filter criterion;
identifying a second filter criterion value of the data item for the second filter criterion;
among the data item partitions, identifying the data item partition storing data items having the second filter criterion value for the second filter criterion; and
storing the data item in the data item partition.

7. The method of claim 5, wherein invoking the data store with the request further comprises:
invoking the data store with the request and a first filter criterion value for a first filter criterion and a second filter criterion value for a second filter criterion comprising:
using the index, identifying the data item partitions storing data items having the first filter criterion value for the first filter criterion;
among the data item partitions, identifying the data item partition storing data items having the second filter criterion value for the second filter criterion; and
invoking the data item partition with the request to retrieve the at least one data item.

8. The method of claim 1, wherein:

the request further specifies a first filtered data subset that is to be used to generate the filtered data subset; and invoking the data store with the request further comprises:
invoking the data store with the request and the first filtered data subset to retrieve the data items of the data set satisfying the at least one filter criterion and using the first filtered data subset to generate a filtered data subset.

9. The method of claim 8, wherein the first filtered data subset is generated by the data store in response to a preceding request specifying at least one first filter criterion.

10. The method of claim 1, wherein executing the instructions further causes the computer to, before invoking the request to retrieve the filtered data subset:
estimate a filtered data subset size of the filtered data subset;
send the filtered subset data size to the requester; and
responsive to receiving from the requester a filtered data subset authorization, send the filtered data subset in response to the request.

11. The method of claim 1, wherein:

the data items of the data set are distributed between a first data store and a second data store; and invoking the data store with the filtering request further comprises:
between the first data store and the second data store, identify a selected data store that is likely to contain the data items specified by the query; and
invoke the selected data store with the filtering request.

12. The method of claim 1, wherein:

executing the instructions further causes the device to:
among attributes of the data set, identify a selected attribute that is likely to be targeted by filter criteria; and
responsive to receiving the data item to be stored with the data set, indexing the data item in an index according to the selected attribute.

13. The method of claim 12, wherein:
the index further comprises:
   a first index that indexes the data items according to a first attribute, and
   a second index that indexes the data items according to a second attribute; and
indexing the data item further comprises:
   indexing the data item in the first index according to the first attribute; and
   indexing the data item in the second index according to the second attribute.

14. A device that applies queries to a data set comprising a set of records that are stored by a remote data store accessible through a remote server, the device comprising:
a processor, and
a memory storing instructions that, when executed by the processor, instructions that cause the device to:
   receive a query targeting the data set, wherein the query specifies a set of selected attributes on the data set and a computation to be applied only to a portion of the data set that matches at least one filter criterion;
   partition the query into a filter portion that filters the data set into a filtered data subset that satisfies the at least one filter criterion, and a computation portion specifying at least one computation to be performed only on the filtered data subset;
   according to the filter portion of the query, generate a filtering request to retrieve a filtered data subset comprising a first portion of the data set satisfying the at least one filter criterion and excluding a second portion of the data set not satisfying the at least one filter criterion, according to the at least one filter criterion distinguishing the first portion from the second portion of the data set;
   send the generated filtering request to the remote data store to return the selected attributes of all records satisfying the filter criterion and excluding all records not satisfying the filter criterion; and
   responsive to receiving the selected attributes of the filtered data subset from the remote data store responsive to the filtering request, apply the computation portion of the query to the filtered data subset.

15. The device of claim 14, wherein:
the query further comprises:
   a first filter criterion generating a first filtered data subset, and
   a second filter criterion generating a second filtered data subset from the first filtered data subset;
generating the request further comprises: generating a first request specifying the first data subset filtered according to the first filter criterion;
sending the request to the remote data store further comprises: sending the first request to the remote data store; and
applying the query further comprises:
   responsive to receiving from the remote data store the first filtered data subset in response to the first request:
      generating a second request specifying the second data subset filtered according to the second filter criterion and using the first filtered data subset; and
      sending the second request to the remote data store; and
   responsive to receiving from the remote data store the second filtered data subset in response to the second request, apply the computation portion of the query to the second filtered data subset.

16. The device of claim 14, wherein executing the instructions further causes the device to, before receiving the filtered data subset from the remote data store:
   receive from the remote data store a filtered data subset size of the filtered data subset;
   verify the filtered data subset size to generate a filtered data subset authorization; and
   responsive to generating a filtered data subset authorization, send the filtered data subset authorization to the remote data store.

17. A memory device storing instructions that, when executed on a processor of a computer having access to a data store, cause the device to apply queries to a data set stored by the data store, by:
   receive a query targeting the data set and specifying a set of selected attributes of the data set and a computation to be applied only to a portion of the data set that matches at least one filter criterion;
   partition the query into a filter portion that filters the data set into a filtered data subset according to the at least one filter criterion, and a computation portion specifying at least one computation to be performed only on the filtered data subset of the data store;
   according to the filter portion of the query, generate a filtering request to retrieve a filtered data subset comprising a first portion of the data set satisfying the at least one filter criterion and excluding a second portion of the data set not satisfying the at least one filter criterion, according to the at least one filter criterion distinguishing the first portion from the second portion of the data set;
   send the generated filtering request to the data store to cause the data store to return the selected attributes of all records satisfying the filter criterion and exclude all records not satisfying the filter criterion; and
   responsive to receiving the selected attributes of the filtered data subset from the data store, apply the computation portion of the query only to the filtered data subset.

18. The memory device of claim 17, wherein:
the query further comprises:
   a first filter criterion generating a first filtered data subset, and
   a second filter criterion generating a second filtered data subset the first filtered data subset;
generating the request further comprises: generating a first request specifying the first data subset filtered according to the first filter criterion;
sending the request to the data store further comprises: sending the first request to the data store; and
applying the query further comprises:
   responsive to receiving from the data store the first filtered data subset in response to the first request:
      generating a second request specifying the second data subset filtered according to the second filter criterion and using the first filtered data subset; and
      sending the second request to the data store; and
   responsive to receiving from the data store the second filtered data subset in response to the second request, applying the computation portion of the query to the second filtered data subset.

19. The memory device of claim 17, wherein executing further the instructions further causes the computer to, before receiving the filtered data subset from the data store:

receive from the data store a filtered data subset size of the filtered data subset;

verify the filtered data subset size to generate a filtered data subset authorization; and responsive to generating a filtered data subset authorization, send the filtered data subset authorization to the data store.

20. The memory device of claim 17, wherein:

the data store further comprises an index that specifies, for a filter criterion value of the filter criterion, a data item set identifying the data items of the data set having the filter criterion value for the filter criterion; and the filtering request further specifies the filter criterion that is indexed by the index stored by the data store.

\* \* \* \* \*

UNITED STATES PATENT AND TRADEMARK OFFICE
CERTIFICATE OF CORRECTION

PATENT NO. : 10,311,105 B2  
APPLICATION NO. : 12/979467  
DATED : June 4, 2019  
INVENTOR(S) : Nir Nice et al.

Page 1 of 1

It is certified that error appears in the above-identified patent and that said Letters Patent is hereby corrected as shown below:

In the Claims

Claim 14, Column 21 Line 17, delete "instructions that".

Signed and Sealed this  
Twenty-seventh Day of August, 2019

Andrei Iancu  
*Director of the United States Patent and Trademark Office*